(12) United States Patent
Honji

(10) Patent No.: US 11,206,381 B2
(45) Date of Patent: *Dec. 21, 2021

(54) VIDEO PROCESSING APPARATUS, VIDEO PROCESSING METHOD, AND PROGRAM

(71) Applicant: SONY CORPORATION, Tokyo (JP)

(72) Inventor: Hidetaka Honji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,749

(22) Filed: Aug. 24, 2020

(65) Prior Publication Data

US 2020/0389634 A1    Dec. 10, 2020

Related U.S. Application Data

(63) Continuation of application No. 16/476,601, filed as application No. PCT/JP2018/000782 on Jan. 15, 2018.

(30) Foreign Application Priority Data

Jan. 16, 2017    (JP) .............................. JP2017-005232

(51) Int. Cl.
  *H04N 9/68*    (2006.01)
  *H04N 5/268*    (2006.01)

(52) U.S. Cl.
  CPC ............... *H04N 9/68* (2013.01); *H04N 5/268* (2013.01)

(58) Field of Classification Search
  CPC ........ H04N 5/268; H04N 5/4401; H04N 7/01; H04N 7/0135; H04N 7/012; H04N 7/0125;
  (Continued)

(56) References Cited

U.S. PATENT DOCUMENTS

2013/0121572 A1    5/2013    Paris et al.
2014/0210847 A1    7/2014    Knibbeler et al.
(Continued)

FOREIGN PATENT DOCUMENTS

CN    103827956 A    5/2014
CN    105393549 A    3/2016
(Continued)

OTHER PUBLICATIONS

Oct. 11, 2019, European Search Report issued for related EP Application No. 18738834.3.

*Primary Examiner* — Sherrie Hsia
(74) *Attorney, Agent, or Firm* — Paratus Law Group, PLLC

(57) ABSTRACT

There is provided a video processing apparatus, method, and program to enable electro optical transfer processing on video data to be suitably performed. The video processing apparatus includes an acquisition unit configured to acquire video data obtained by performing high dynamic range optical electro transfer on high dynamic range video data, a processing unit configured to perform processing including electro optical transfer on the acquired video data and obtains display video data, and a control unit. In the processing unit, the characteristic of the electro optical transfer is set to a characteristic corresponding to characteristic information of optical electro transfer associated with the acquired video data. The control unit is configured to switch the characteristic of the electro optical transfer in the processing unit in accordance with a selection operation of a user.

7 Claims, 5 Drawing Sheets

(58) Field of Classification Search
CPC .... H04N 7/0112; H04N 7/0882; H04N 7/025;
H04N 7/0888; H04N 9/68; H04N 9/64
USPC ........ 348/453, 571, 708, 441, 461, 467, 705
See application file for complete search history.

(56) References Cited

U.S. PATENT DOCUMENTS

2017/0330529 A1* 11/2017 Van Mourik ............ H04N 9/68
2018/0352206 A1   12/2018 Uchimura

FOREIGN PATENT DOCUMENTS

| JP | 2014-531821 A | 11/2014 |
| JP | 2016-111691 A | 6/2016 |
| JP | 2016-195450 A | 11/2016 |

* cited by examiner

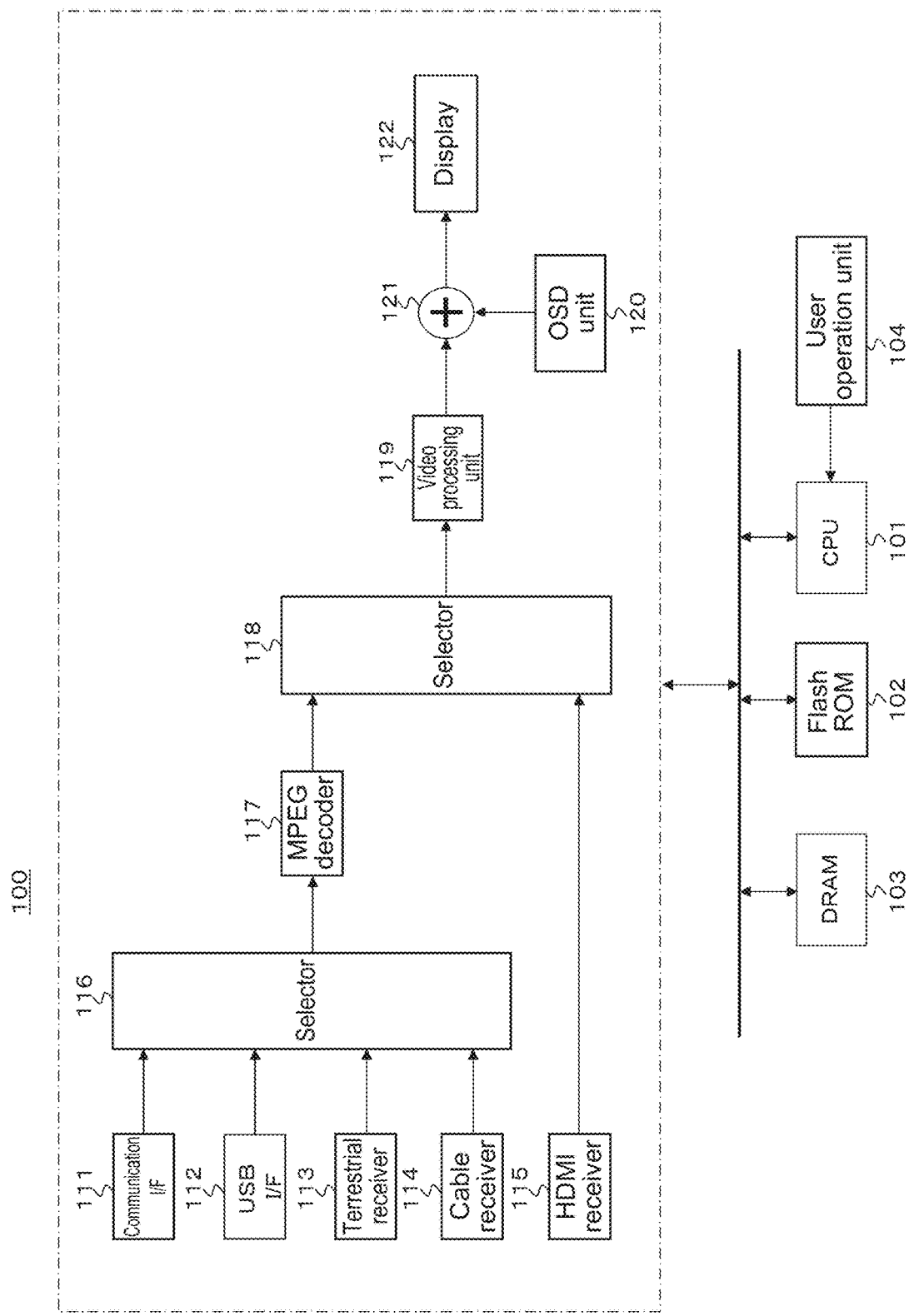

| vui_parameters() { | Descriptor |
|---|---|
|   aspect_ratio_info_present_flag | U(1) |
|   if( aspect_ratio_info_present_flag){ | |
|     aspect_ratio_idc | U(8) |
|     if( aspect_ratio_idc == EXTENDED_SAR) { | |
|       sar_width | U(16) |
|       sar_height | U(16) |
|     } | |
|   } | |
|   overscan_info_present_flag | U(1) |
|   if( overscan_info_present_flag) | |
|     overscan_appropriate_flag | U(1) |
|   video_signal_type_present_flag | U(1) |
|   if( video_signal_type_present_flag) { | |
|     video_format | U(3) |
|     video_full_range_flag | U(1) |
|     colour_description_present_flag | U(1) |
|     if( colour_description_present_flag) { | |
|       colour_primaries | U(8) |
|       transfer_characteristics | U(8) |
|       matrix_coeffs | U(8) |
|     } | |
|   } | |

| Value | Transfer Characteristic | Informative Remark |
|---|---|---|
| 1 | $V = \alpha * L_c^{0.45} - (\alpha - 1)$ for $1 >= L_c >= \beta$<br>$V = 4.500 * L_c$ for $\beta > L_c >= 0$ | Rec. ITU-R BT.709-6<br>Rec. ITU-R BT.1361-0 conventional colour gamut system (historical)<br>(functionally the same as the values 6, 14, and 15) |
| 6 | $V = \alpha * L_c^{0.45} - (\alpha - 1)$ for $1 >= L_c >= \beta$<br>$V = 4.500 * L_c$ for $\beta > L_c >= 0$ | Rec. ITU-R BT.601-6 525 or 625<br>Rec. ITU-R BT.1358-1 525 or 625 (historical)<br>Rec. ITU-R BT.1700 NTSC<br>Society of Motion Picture and Television Engineers 170M (2004)<br>(functionally the same as the values 1, 14, and 15) |
| 14 | $V = \alpha * L_c^{0.45} - (\alpha - 1)$ for $1 >= L_c >= \beta$<br>$V = 4.500 * L_c$ for $\beta > L_c >= 0$ | Rec. ITU-R BT.2020-2<br>(functionally the same as the values 1, 6, and 15) |
| 15 | $V = \alpha * L_c^{0.45} - (\alpha - 1)$ for $1 >= L_c >= \beta$<br>$V = 4.500 * L_c$ for $\beta > L_c >= 0$ | Rec. ITU-R BT.2020-2<br>(functionally the same as the values 1, 6, and 14) |
| 16 | $V = ((c_1 + c_2 * L_o^n) \div (1 + c_3 * L_o^n))^m$ for all values of $L_o$<br>$c_1 = c_3 - c_2 + 1 = 3424 \div 4096 = 0.8359375$<br>$c_2 = 32 * 2413 \div 4096 = 18.8515625$<br>$c_3 = 32 * 2392 \div 4096 = 18.6875$<br>$m = 128 * 2523 \div 4096 = 78.84375$<br>$n = 0.25 * 2610 \div 4096 = 0.1593017578125$<br>for which $L_o$ equal to 1 for peak white is ordinarily intended to correspond to a reference output luminance level of 10 000 candelas per square metre | Society of Motion Picture and Television Engineers ST 2084 for 10, 12, 14, and 16-bit systems |
| 18 | $V = a * \text{Ln}(12 * L_c - b) + c$ for $1 >= L_c > 1 \div 12$<br>$V = \text{Sqrt}(3) * L_c^{0.5}$ for $1 \div 12 >= L_c >= 0$<br>$a = 0.17883277, b = 0.28466892, c = 0.55991073$ | Association of Radio Industries and Businesses (ARIB) STD-B67, BT.2100(HLG) |

| | 7 | 6 | 5 | 4 | 3 | 2 | 1 | 0 |
|---|---|---|---|---|---|---|---|---|
| InfoFrame Type Code | InfoFrame Type = 0x07 | | | | | | | |
| InfoFrame Version number | Version=0x01 | | | | | | | |
| Length of Info Frame | Length of following HDR Metadata InfoFrame | | | | | | | |
| Data Byte 1 | F17=0 | F16=0 | F15=0 | F14=0 | F13=0 | EOTF (3 bits) | | |
| Data Byte 2 | F27=0 | F26=0 | F25=0 | F24=0 | F23=0 | Static_Metadata_Descriptor_ID (3 bits) | | |
| Data Byte 3 | Static_Metadata_Descriptor | | | | | | | |
| ... | ... | | | | | | | |
| Data Byte n | | | | | | | | |

(b)

| EOTF | EOTF of stream |
|---|---|
| 0 | Traditional gamma - SDR Luminance Range |
| 1 | Traditional gamma - HDR Luminance Range |
| 2 | SMPTE ST 2084 [41] |
| 3 | Hybrid Log-Gamma (HLG) based on ITU-R BT.2100-0 [51] |
| 4-7 | Reserved for future use |

FIG.4

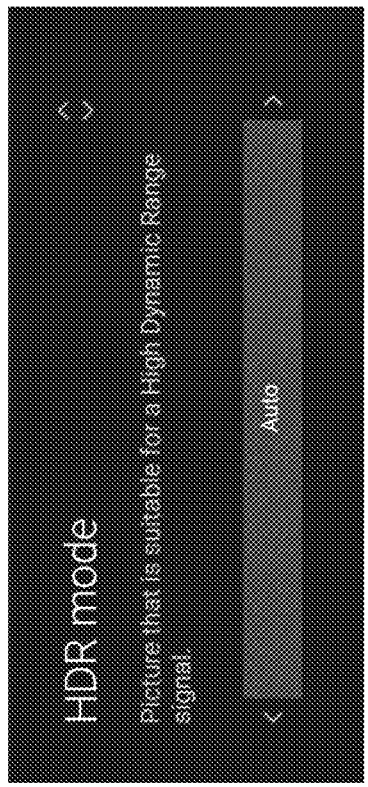
(b)
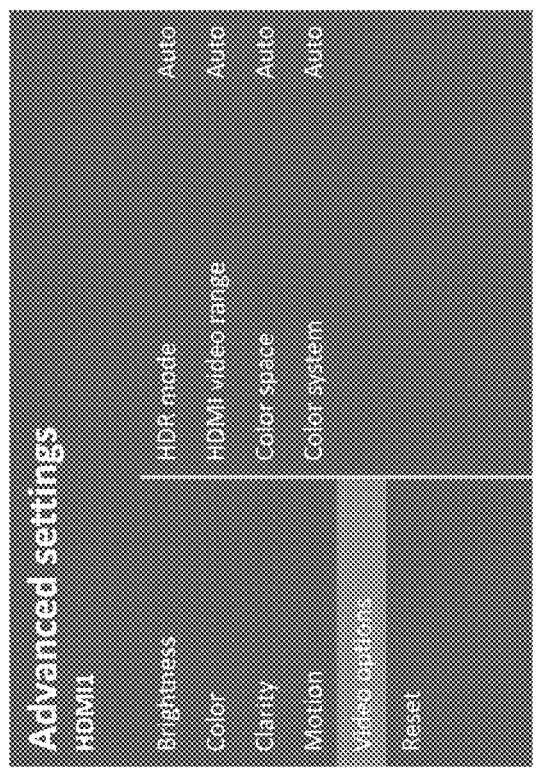
(a)
(c) Auto – HDR10 – HLG – Off
FIG. 5

VIDEO PROCESSING APPARATUS, VIDEO PROCESSING METHOD, AND PROGRAM

CROSS REFERENCE TO RELATED APPLICATIONS

This application is a continuation of U.S. patent application Ser. No. 16/476,601 (filed on Jul. 9, 2019), which is a National Stage Patent Application of PCT International Patent Application No. PCT/JP2018/000782 (filed on Jan. 15, 2018) under 35 U.S.C. § 371, which claims priority to Japanese Patent Application No. 2017-005232 (filed on Jan. 16, 2017), which are all hereby incorporated by reference in their entirety.

TECHNICAL FIELD

The present technology relates to a video processing apparatus, a video processing method, and a program, and more particularly to a video processing apparatus and the like that acquires and processes video data subjected to tone compression by performing high dynamic range (HDR) optical electro transfer.

BACKGROUND ART

Conventionally, a video processing apparatus is known. This video processing apparatus acquires video data obtained by performing high dynamic range optical electro transfer on high dynamic range video data through an input system of broadcasting or the like and obtains display video data by performing processing including high dynamic range electro optical transfer on this video data (e.g., see Patent Literature 1).

CITATION LIST

Patent Literature

Patent Literature 1: Japanese Patent Application Laid-open No. 2016-195450

DISCLOSURE OF INVENTION

Technical Problem

Characteristic information of the optical electro transfer is adapted to be inserted into the video data obtained by performing the high dynamic range optical electro transfer on the high dynamic range video data. The display video data can be obtained by performing electro optical transfer on the video data on the basis of this characteristic information of the optical electro transfer.

In this case, if the characteristic information of the optical electro transfer inserted in the video data has an error, suitable electro optical transfer is not performed, and thus the display video data cannot be correctly obtained. For example, it is conceivable that the characteristic information of the optical electro transfer is not correctly inserted in the video data in a case where a video data input system uses a medium interface such as a USB memory, a communication interface such as the Internet, a digital interface such as HDMI, or the like.

It is an object of the present technology to cause electro optical transfer processing on video data to be suitably performed.

Solution to Problem

In accordance with a concept of the present technology, a video processing apparatus includes:

an acquisition unit that acquires video data obtained by performing high dynamic range optical electro transfer on high dynamic range video data;

a processing unit that performs processing including electro optical transfer on the acquired video data and obtains display video data, the characteristic of the electro optical transfer being, in the processing unit, set to a characteristic corresponding to characteristic information of optical electro transfer associated with the acquired video data on an automatic mode; and a control unit that switches the characteristic of the electro optical transfer in the processing unit in accordance with a selection operation of a user.

In the present technology, the video data obtained by performing the high dynamic range optical electro transfer on the high dynamic range video data is acquired by the acquisition unit. Then, the processing including the electro optical transfer is performed on the acquired video data by the processing unit and the display video data is obtained. In the processing unit, the characteristic of the electro optical transfer is set to correspond to the characteristic information of the optical electro transfer associated with the acquired video data on the automatic mode.

The characteristic of the electro optical transfer in the processing unit is switched by the control unit in accordance with the selection operation of the user. For example, the control unit may determine whether or riot the characteristic of the electro optical transfer is switchable on the basis of an input system of the video data acquired by the acquisition unit, and switch, if the control unit determines that the characteristic of the electro optical transfer is switchable, the characteristic of the electro optical transfer in the processing unit in accordance with the selection operation of the user. In this case, for example, the control unit may determine that the characteristic of the electro optical transfer is riot switchable in a case where the input system is broadcasting.

Further, for example, the control unit may determine whether or riot the characteristic of the electro optical transfer is switchable on the basis of the characteristic information of the optical electro transfer associated with the acquired video data, and switch, if the control unit determines that the characteristic of the electro optical transfer is switchable, the characteristic of the electro optical transfer in the processing unit in accordance with the selection operation of the user. In this case, for example, the control unit may determine that the characteristic of the electro optical transfer is not switchable in a case where the characteristic information of the optical electro transfer is characteristic information of the high dynamic range optical electro transfer.

For example, the characteristic of the electro optical transfer to be switched in accordance with the selection operation of the user may include a characteristic based on first high dynamic range electro optical transfer and a characteristic based on second high dynamic range electro optical transfer. In this case, for example, the characteristic based on the first high dynamic range electro optical transfer may correspond to a characteristic prescribed in SMPTE ST2084 or ITU-R BT.2100, and the characteristic based on the second high dynamic range electro optical transfer may correspond to a characteristic prescribed in ITU-R BT.2100 (different from the ITU-R BT.2100).

In this manner, in the present technology, the characteristic of the electro optical transfer in the processing unit can be switched in accordance with the selection operation of the user. Therefore, even if the characteristic information of the optical electro transfer inserted in the video data has an error. The electro optical transfer processing on the video data is enabled to be suitably performed.

It should be noted that in the present technology, for example, the control unit, may perform control to perform display for switching the characteristic of the electro optical transfer and the selection operation of the user may be performed on the basis of this display. In this case, it becomes possible for the user to easily and precisely perform the selection operation on the basis of the display.

Advantageous Effects of Invention

In accordance with the present technology, it becomes possible to cause electro optical transfer processing on video data to be suitably performed. It should be noted that the effects described in this specification are merely exemplary, not limitative, and additional effect(s) described may be provided.

BRIEF DESCRIPTION OF DRAWINGS

FIG. 1 A block diagram showing a configuration example of a video processing apparatus as an embodiment.

FIG. 2 A diagram showing a part of a structure example of VUI parameters.

FIG. 3 A diagram for describing the field of "transfer_characteristics" in the VUI parameters.

FIG. 4 A diagram showing a structure example of a dynamic range and mastering infoFrame packet.

FIG. 5 A diagram showing an example of a UI screen for switching a characteristic of electro optical transfer.

MODE(S) FOR CARRYING OUT THE INVENTION

Hereinafter, a mode for carrying out the invention (hereinafter, referred to as "embodiment") will be described. It should be noted that descriptions will be given in the following order.
1. Embodiment
2. Modified Example 1. Embodiment Configuration Example of Video Processing Apparatus FIG. 1 shows a configuration example of a video processing apparatus 100 as an embodiment. The video processing apparatus 100 includes a CPU 101, a flash ROM 102, a DRAM 103, and a user operation unit 104.

Further, the video processing apparatus 100 includes a communication interface 111, a universal serial bus (USB) interface 112, a terrestrial receiver 113, a cable receiver 114, a high-definition multimedia interface (HDMI) receiver 115, and a selector 116. Further, the video processing apparatus 100 includes an MPEG decoder 117, a selector 118, a video processing unit 119, an OSD unit 120, a compositing unit 121, and a display 122. It should be noted that the "HDMI" is a registered trademark.

The CPU 101 controls operations of the respective units of the video processing apparatus 100. The flash ROM 102 stores control software and saves data. The DRAM 103 configures a work area for the CPU 101. The CPU 101 controls the respective units of the video processing apparatus 100 by developing software and data read from the flash ROM 102 onto the DRAM 103 and starting the software.

The user operation unit 104 configures a user interface for a user to perform various operations and is connected to the CPU 101. In this embodiment, as will be described later, a selection operation for switching a characteristic of electro optical transfer in the video processing unit 119 is also enabled to be performed under a certain condition.

The communication interface 111 obtains compressed video data from a server over a network such as the Internet via a wired local area network (LAN) or a wireless LAN. This compressed video data is obtained by performing high dynamic range optical electro transfer on high dynamic range video data and further performing coding such as MPEG4-AVC (Advanced Video Coding) and HEVC (High Efficiency Video Coding), for example. It should be noted that the same applies to compressed video data acquired by the USB interface 112, the terrestrial receiver 113, and the cable receiver 114 to be shown below.

The high dynamic range optical electro transfer means tone compression processing of performing bit length compression from a linear region by using an optical-electro transfer function (OETF) for a high dynamic range. By this tone compression processing, the high dynamic range video data becomes one subjected to tone compression with a log curve characteristic.

Here, the log curve characteristic refers to a characteristic curve in which a low luminance tone is dense and a high luminance tone is sparse, not to a logarithmic function itself. For example, there are perceptual quantization (PQ) curve characteristics, hybrid log-gamma (HLG) curve characteristics, and the like. The PQ curve is standardized as SMPTE ST2084 or ITU-R BT.2100 (PQ). The HLG curve is standardized as ITU-R BT.2100 (HLG).

The USB interface 112 obtains compressed video data from a video device connected with a USB cable or a directly connected USB memory. The terrestrial receiver 113 receives terrestrial digital broadcasting and obtains compressed video data. The cable receiver 114 receives cable broadcasting and obtains compressed video data.

A region of video usability information (VUI) is present in an SPS NAL unit of an access unit (AU) of compressed video data obtained by the communication interface 111, the USE interface 112, the terrestrial receiver 113, and the cable receiver 114. The characteristic information of the optical electro transfer is adapted to be inserted into this region.

FIG. 2 shows a part of a structure example (Syntax) of VUI parameters (vui_parameters). The 8-bit field of "transfer_characteristics" indicates the characteristic information of the optical electro transfer. As shown in. FIG. 3, for example, when the value is "16", it indicates that optical electro transfer using the PQ curve is performed, and when the value is "18", it indicates that optical electro transfer using the HLG curve is performed.

Referring back to FIG. 1, the HDMI receiver 115 receives non-compressed video data from a video device such as a set top box and a player through communication based on the HDMI. This video data is obtained by performing the high dynamic range optical electro transfer on the high dynamic range video data. The characteristic information of the optical electro transfer is adapted to be described in a dynamic range and mastering infoFrame packet inserted into a blanking interval of this video data.

(A) of FIG. 4 shows the structure example (Syntax) of the dynamic range and mastering infoFrame packet. "InfoFrame Type" indicating the type of the infoFrame is defined at a zeroth byte. Here, it is "0x07" indicating the dynamic range and mastering infoFrame packet.

"EOTF" of 3 bits is defined at a second bit to a zeroth bit of Data Byte 1. As shown in (b) of FIG. 4, for example, when it is "2", it indicates that the optical electro transfer using the PQ curve is performed and when it is "3", it indicates that the optical electro transfer using the HLG curve is performed.

The HDMI receiver 115 extracts various types of information inserted in the blanking interval of the video data and transmits the various types of information to the CPU 101. This information also includes the characteristic information of the optical electro transfer described in the dynamic range and mastering infoFrame packet.

Referring back to FIG. 1, the selector 116 selectively extracts the compressed video data obtained by the communication interface 111, the USB interface 112, the terrestrial receiver 113, or the cable receiver 114 in accordance with a selection operation of the user from the user operation unit 104 under the control of the CPU 101.

The MPEG decoder 117 decodes the compressed video data extracted by the selector 116 and obtains non-compressed video data. Further, the MPEG decoder 117 extracts various types of information including a parameter set, an SEI message, and the like inserted into the compressed video data and transmits the various types of information to the CPU 101. This information also includes the characteristic information of the optical electro transfer inserted into a VUI region of the SPS NAL unit.

The selector 118 selectively extracts the non-compressed video data obtained by the MPEG decoder 117 or the HDMI receiver 115 in accordance with a selection operation of the user from the user operation unit 104 under the control of the CPU 101. The video processing unit 119 performs electro optical transfer processing, image-quality adjustment processing, and the like on the video data extracted by the selector 118 and obtains display video data.

In this case, the characteristic of the electro optical transfer in the video processing unit 119 is set to be a characteristic opposite to the characteristic of the optical electro transfer performed on the video data on the basis of optical electro transfer information on an automatic mode under the control of the CPU 101. Further, regarding the characteristic of the electro optical transfer in the video processing unit 119, the automatic mode is cancelled and manual switching is enabled to be performed in accordance with a selection operation of the user from the user operation unit 104 under the control of the CPU 101.

In this embodiment, the characteristic of the electro optical transfer is made switchable to a characteristic corresponding to the PQ curve, a characteristic corresponding to the HLG curve, or a characteristic corresponding to the standard dynamic range as a high dynamic range electro optical transfer characteristic.

An on screen display (OSD) unit 120 generates a display signal as an OSD signal under the control of the CPU 101. A display signal for displaying a user interface (UI) screen for manually switching the characteristic of the electro optical transfer in accordance with a user's operation as described above is also generated. For example, by selecting "HDR mode" in the item of "Video options" in the UI screen of advance setting shown in (a) of FIG. 5, the UI screen as shown in (b) of FIG. 5 is displayed.

The user operates the user operation unit 104 on the basis of this UI screen, such that the respective modes of "Auto", "HDR10", "HLG", and "Off" shown in (c) of FIG. 5 are made selectively switchable. The mode of "Auto" is the above-mentioned automatic mode.

The mode of "HDR10" is a mode to fix the characteristic of the electro optical transfer in the video processing unit 119 to the characteristic corresponding to the PQ curve. The mode of "HLG" is a mode to fix the characteristic of the electro optical transfer in the video processing unit 119 to the characteristic corresponding to the HLG curve. The mode of "Off" is a mode to fix the characteristic of the electro optical transfer in the video processing unit 119 to the standard dynamic range (SDR) electro optical transfer characteristic.

It should be noted that the CPU 101 determines whether or not it is possible for the user to selectively switch the mode of "Auto" to any mode of "HDR10", "HLG", and "Off" and makes it switchable if the CPU 101 determines that it is possible. In this embodiment, the CPU 101 determines that it is not switchable in a case where the input system of the video data extracted by the selector 118 is broadcasting (terrestrial broadcasting or cable broadcasting). The CPU 101 determines that it is switchable in other cases.

In a case where the input system is broadcasting, the accuracy of the optical electro transfer information inserted in the compressed video data is high. It can be thus considered that even if the characteristic of the electro optical transfer in the video processing unit 119 is set to be based on the characteristic information of the optical electro transfer on the automatic mode, the electro optical transfer processing on the video data can be suitably performed. Therefore, the above determination is made in order to avoid processing with an erroneous electro optical transfer characteristic caused by switching the characteristic of the electro optical transfer in the video processing unit 119 in accordance with a user's operation.

It should be noted that other than the case where the input system is broadcasting, in a case where a input system is sufficiently reliable in which the accuracy of the characteristic information of the optical electro transfer is high, for example, in a case of video data from a content server like "Netflix", it can also be determined that switching from the automatic mode to another mode is impossible. "Netflix" is a registered trademark.

Referring back to FIG. 1, the compositing unit 121 combines display video data obtained by the video processing unit 119 with a display signal generated by the OSD unit 120. The display 122 displays an image based on the display video data obtained by the compositing unit 121. This display 122 includes, for example, a liquid crystal display (LCD), an organic electroluminescence display (organic EL display), and the like.

An operation of the video processing apparatus 100 shown in FIG. 1 will be briefly described. In the communication interface 111, compressed video data is obtained from the server over the network such as the Internet through the wired LAN or the wireless LAN. In the USB interface 112, compressed video data is obtained from the video device connected with the USE cable or the directly connected USE memory in the terrestrial receiver 113, terrestrial digital broadcasting is received and compressed video data is obtained in the cable receiver 114, cable broadcasting is received and compressed video data is obtained.

In this manner, the compressed video data obtained by the communication interface 111, the USB interface 112, the terrestrial receiver 113, and the cable receiver 114 is obtained by performing the high dynamic range optical electro transfer on the high dynamic range video data and further performing coding such as MPEG4-AVC and HEVC, for example. In the SPS NAL unit of the access unit (AU) of this compressed video data, a region of video usability information (VUI) is present and the characteristic information of the optical electro transfer is adapted to be inserted into this region.

The compressed video data obtained by the communication interface 111, the USE interface 112, the terrestrial receiver 113, and the cable receiver 114 is supplied to the selector 116. In this selector 116, the compressed video data obtained by the communication interface 111, the USE interface 112, the terrestrial receiver 113, or the cable receiver 114 is selectively extracted by accordance with a selection operation of the user from the user operation unit 104 under the control of the CPU 101.

The compressed video data extracted by the selector 116 is supplied to the MPEG decoder 117. In the MPEG decoder 117, decoding is performed on the compressed video data extracted by the selector 116 and non-compressed video data is obtained. Further, in the MPEG decoder 117, various types of information including a parameter set, an SEI message, and the like inserted into the compressed video data are extracted and the various types of information are transmitted to the CPU 101. This information also includes the characteristic information of the optical electro transfer inserted into the VUI region of the SPS NAL unit (see FIGS. 2 and 3).

In the HDMI receiver 115, non-compressed video data is received from the video device such as the set top box and a reproduction device through communication based on the HDMI. This video data is obtained by performing the high dynamic range optical electro transfer on the high dynamic range video data. Further, in the HDMI receiver 115, various types of information inserted into the blanking interval of the video data are extracted and the various types of information are transmitted to the CPU 101. This information also includes the characteristic information of the optical electro transfer described in the dynamic range and mastering infoFrame packet (see FIG. 4).

The non-compressed video data obtained by the MPEG decoder 117 and the HDMI receiver 115 is supplied to the selector 118. In the selector 118, the non-compressed video data obtained by the MPEG decoder 117 or the HDMI receiver 115 is selectively extracted by accordance with a selection operation of the user from the user operation unit 104 under the control of the CPU 101.

Non-compressed the video data extracted by the selector 118 is supplied to the video processing unit 119. In this video processing unit 119, display video data is obtained by performing electro optical transfer processing, image-quality adjustment processing, and the like on the video data extracted by the selector 118.

The characteristic of the electro optical transfer in the video processing unit 119 is set to be a characteristic opposite to the characteristic of the optical electro transfer performed on the video data on the basis of optical electro transfer information on the automatic mode under the control of the CPU 101. Further, regarding the characteristic of the electro optical transfer in the video processing unit 119, the automatic mode is cancelled and manual switching is enabled to be performed in accordance with a selection operation of the user from the user operation unit 104 under the control of the CPU 101.

In this case, the characteristic of the electro optical transfer is made switchable to a characteristic corresponding to the PQ curve, a characteristic corresponding to the HLG curve, or a characteristic corresponding to the standard dynamic range as a high dynamic range electro optical transfer characteristic. It should be noted that the CPU 101 determines that it is not switchable in a case where the input system of the video data extracted by the selector 118 is broadcasting (terrestrial broadcasting or cable broadcasting). The CPU 101 determines that it is switchable in other cases.

In the OSD unit 120, a display signal as an OSD signal is generated under the control of the CPU 101. A display signal for switching a UI screen for switching the characteristic of the electro optical transfer in the video processing unit 119 is also generated. (see (a) and (b) of FIG. 5). The display signal generated by the USC unit 120 is supplied to the compositing unit 121.

In the compositing unit 121, display video data obtained by the video processing unit 119 is combined with a display signal generated by the OSD unit 120. The display video data obtained by the compositing unit 121 supplied to the display 122. The image based on the display video data is displayed on the display 122. Then, the UI screen based on the display signal is displayed on this image as appropriate (see FIG. 5).

As described above, in the video processing apparatus 100 shown in FIG. 1, the characteristic of the electro optical transfer in the video processing unit 119 can be switched in accordance with a selection operation of the user by cancelling the automatic mode. Therefore, even if the characteristic information of the optical electro transfer inserted in the video data has an error, it is possible to cause the electro optical transfer processing on the video data to be suitably performed. With this configuration, the image display can be suitably performed.

Further, in the video processing apparatus 100 shown in FIG. 1, the CPU 101 determines that it is not switchable in a case where the input system of the video data extracted by the selector 118 is broadcasting (terrestrial broadcasting or cable broadcasting). The CPU 101 determines that it is switchable in other cases. With this configuration, processing with an erroneous electro optical transfer characteristic can be avoided by switching the characteristic of the electro optical transfer in the video processing unit 119 in accordance with a user's operation in a case where it is a broadcasting input system in which the accuracy of the optical electro transfer information inserted into the compressed video data is high.

Further, in the video processing apparatus 100 shown in FIG. 1, a display signal for displaying a UI screen for switching the characteristic of the electro optical transfer in the video processing unit. 119 is also generated through the CSD unit 120 under the control of the CPU 101. Therefore, on the basis of the UI screen (UI display), the user can easily and precisely perform a selection operation.

2. Modified Example

It should be noted that in the above-mentioned embodiment, the CPU 101 determines that it is not switchable in the case where the input system of the video data extracted by the selector 118 is broadcasting (terrestrial broadcasting or cable broadcasting) and determines that it is switchable in the other cases.

However, a determination criteria for determining whether or not it is switchable is not limited thereto. It is also conceivable that the CPU 101 determines whether or not it is switchable on the basis of optical electro transfer information associated with the non-compressed video data extracted by the selector 118, for example. For example, the CPU 101 may determine that it is not switchable in a case where the characteristic information of the optical electro transfer is characteristic information of high dynamic range electro optical transfer and may determine that it is switchable in other cases.

In this case, if the non-compressed video data extracted by the selector 118 has been obtained by the MPEG decoder 117, the CPU 101 determines that it is not switchable if "transfer_characteristics" is the value of "16" or "18" and determines that it is switchable if "transfer_characteristics" is another value. If "transfer_characteristics" is the value of "16" or "18", it can be considered that the generator side has input the high dynamic range information. Therefore, fixing to the automatic mode is performed such that switching of the characteristic of the electro optical transfer according to the user's operation is made impossible. On the other hand, if "transfer_characteristics" is other than the values of "16" and "18", switching of the characteristic of the electro optical transfer according to the user's operation is made possible in view of a possibility that the generator side has not added the high dynamic range information.

Further, in this case, if the non-compressed video data extracted by the selector 118 has been obtained by the HDMI receiver 115, the CPU 101 determines that is not switchable if "EOTF" is the value of "2" or "3" and determines that it is switchable if "EOTF" is another value. If "EOTF" is the value of "2" or "3", it can be considered that the generator side has input the high dynamic range information. Therefore, fixing to the automatic mode is performed such that switching of the characteristic of the electro optical transfer according to the user's operation is made impossible. On the other hand, if "EOTF" is other than the values of "2" and "3", switching of the characteristic of the electro optical transfer according to the user's operation is made possible in view of a possibility that the generator side has not added the high dynamic range information.

Further, in the above-mentioned embodiment, the example in which it is possible for the user to switch to the characteristic corresponding to the PQ curve or the characteristic corresponding to the HLG curve as the characteristic of the high dynamic range optical electro transfer has been shown, though the present technology is not limited thereto. It is also conceivable that it is possible for the user to perform switching to a larger number of characteristics as the characteristic of the high dynamic range optical electro transfer.

Further, the input system in the above-mentioned embodiment is an example and is not limited thereto. Although regarding the broadcasting system, the terrestrial broadcasting and the cable broadcasting are shown for example, BS broadcasting, CS broadcasting, and the like are also conceivable.

Further, it has been assumed that the video processing apparatus 100 in the above-mentioned embodiment is a television set equipped with the receiver, though the present technology is not limited thereto. As a matter of course, the present technology is similarly applicable also to other video processing apparatuses such as a set top box and a player, for example.

Further, the present technology can also take the following configurations.

(1) A video processing apparatus, including:
an acquisition unit that acquires video data obtained by performing high dynamic range optical electro transfer on high dynamic range video data;

a processing unit that performs processing including electro optical transfer on the acquired video data and obtains display video data, the characteristic of the electro optical transfer being, in the processing unit, set to a characteristic corresponding to characteristic information of optical electro transfer associated with the acquired video data on an automatic mode; and a control unit that switches the characteristic of the electro optical transfer in the processing unit in accordance with a selection operation of a user.

(2) The video processing apparatus according to (1), in which
the control unit
determines whether or not the characteristic of the electro optical transfer is switchable on the basis of an input system of the video data acquired by the acquisition unit, and
switches, if the control unit determines that the characteristic of the electro optical transfer is switchable, the characteristic of the electro optical transfer in the processing unit in accordance with the selection operation of the user.

(3) The video processing apparatus according to (2), in which
the control unit determines that the characteristic of the electro optical transfer is not switchable in a case where the input system is broadcasting.

(4) The video processing apparatus according to (1), in which
the control unit
determines whether or not the characteristic of the electro optical transfer is switchable on the basis of the characteristic information of the optical electro transfer associated with the acquired video data, and
switches, if the control unit determines that the characteristic of the electro optical transfer is switchable, the characteristic of the electro optical transfer in the processing unit in accordance with the selection operation of the user.

(5) The video processing apparatus according to (4), in which
the control unit determines that the characteristic of the electro optical transfer is not switchable in a case where the characteristic information of the optical electro transfer is characteristic information of the high dynamic range optical electro transfer.

(6) The video processing apparatus according to any one of (1) to (5), in which
the characteristic of the electro optical transfer to be switched in accordance with the selection operation of the user includes a characteristic based on first high dynamic range electro optical transfer and a characteristic based on second high dynamic range electro optical transfer.

(7) The video processing apparatus according to (6), in which
the characteristic based on the first high dynamic range electro optical transfer corresponds to a characteristic prescribed in SMPTE ST2084 or ITU-R BT.2100, and
the characteristic based on the second high dynamic range electro optical transfer corresponds to a characteristic prescribed in ITU-R BT.2100 (different from the ITU-R BT.2100).

(8) The video processing apparatus according to any one of (1) to (7), in which
the control unit performs control to perform display for switching the characteristic of the electro optical transfer, and
the selection operation of the user is performed on the basis of the display, (9) A video processing method, including:
an acquisition step of acquiring, by an acquisition unit, video data obtained by performing high dynamic range optical electro transfer on high dynamic range video data;
a processing step of obtaining, by a processing unit, display video data by performing processing including electro optical transfer on the acquired video data, the characteristic of the electro optical transfer being, in the processing step, set to a characteristic corresponding to characteristic information of optical electro transfer associated with the acquired video data on an automatic mode; and
a control step of switching, by a control unit, the characteristic of the electro optical transfer in the processing unit in accordance with a selection operation of a user.

(10) A program that causes a computer to execute a video processing method including
an acquisition step of acquiring, by an acquisition unit, video data obtained by performing high dynamic range optical electro transfer on high dynamic range video data,
a processing step of obtaining, by a processing unit, display video data by performing processing including electro optical transfer on the acquired video data, the characteristic of the electro optical transfer being, in the processing step, set to a characteristic corresponding to characteristic information of optical electro transfer associated with the acquired video data on an automatic mode, and
a control step of switching, by a control unit, the characteristic of the electro optical transfer in the processing unit in accordance with a selection operation of a user.

REFERENCE SIGNS LIST 100 video processing apparatus
101 CPU
111 communication interface
112 USB interface
113 terrestrial receiver
114 cable receiver
115 HMI receiver
116, 118 selector
117 MPEG decoder
119 video processing unit
120 OSD unit
121 compositing unit
122 display

The invention claimed is:
1. A video processing apparatus, comprising:
an acquisition unit configured to acquire video data obtained by performing high dynamic range optical electro transfer on high dynamic range video data;
a processing unit configured to perform processing including electro optical transfer on the acquired video data and obtains display video data, the characteristic of the electro optical transfer being, in the processing unit, set to a characteristic corresponding to characteristic information of optical electro transfer associated with the acquired video data on an automatic mode; and
a control unit configured to switch the characteristic of the electro optical transfer in the processing unit in accordance with a selection operation,
wherein the control unit
determines whether or not the characteristic of the electro optical transfer is switchable on a basis of an input system of the video data acquired by the acquisition unit and on a basis of the characteristic information of the optical electro transfer associated with the acquired video data,
switches, if the control unit determines that the characteristic of the electro optical transfer is switchable, the characteristic of the electro optical transfer in the processing unit in accordance with the selection operation, and
determines that the characteristic of the electro optical transfer is not switchable in a case where the input system is broadcasting,
wherein the acquisition unit, the processing unit, and the control unit are each implemented via at least one processor.

2. The video processing apparatus according to claim 1, wherein
the control unit determines that the characteristic of the electro optical transfer is not switchable in a case where the characteristic information of the optical electro transfer is characteristic information of the high dynamic range optical electro transfer.

3. The video processing apparatus according to claim 1, wherein
the characteristic of the electro optical transfer to be switched in accordance with the selection operation includes a characteristic based on first high dynamic range electro optical transfer and a characteristic based on second high dynamic range electro optical transfer.

4. The video processing apparatus according to claim 3, wherein
the characteristic based on the first high dynamic range electro optical transfer corresponds to a characteristic prescribed in SMPTE ST2084 or ITU-R BT.2100, and
the characteristic based on the second high dynamic range electro optical transfer corresponds to a characteristic prescribed in ITU-R BT.2100 (different from the ITU-R BT.2100).

5. The video processing apparatus according to claim 1, wherein
the control unit performs control to perform display for switching the characteristic of the electro optical transfer, and
the selection operation is performed on a basis of the display.

6. A video processing method, comprising:
acquiring video data obtained by performing high dynamic range optical electro transfer on high dynamic range video data;
obtaining display video data by performing processing including electro optical transfer on the acquired video data, the characteristic of the electro optical transfer being set to a characteristic corresponding to characteristic information of optical electro transfer associated with the acquired video data on an automatic mode;
switching the characteristic of the electro optical transfer in accordance with a selection operation;
determining whether or not the characteristic of the electro optical transfer is switchable on a basis of an input system of the acquired video data;
switching, if the characteristic of the electro optical transfer is determined to be switchable, the characteristic of the electro optical transfer in accordance with the selection operation; and
determining that the characteristic of the electro optical transfer is not switchable in a case where the input system is broadcasting.

7. A non-transitory computer-readable medium having embodied thereon a program, which when executed by a computer causes the computer to execute a video processing method, the method comprising:
- acquiring video data obtained by performing high dynamic range optical electro transfer on high dynamic range video data;
- obtaining display video data by performing processing including electro optical transfer on the acquired video data, the characteristic of the electro optical transfer being set to a characteristic corresponding to characteristic information of optical electro transfer associated with the acquired video data on an automatic mode;
- switching the characteristic of the electro optical transfer in accordance with a selection operation;
- determining whether or not the characteristic of the electro optical transfer is switchable on a basis of an input system of the acquired video data;
- switching, if the characteristic of the electro optical transfer is determined to be switchable, the characteristic of the electro optical transfer in accordance with the selection operation; and
- determining that the characteristic of the electro optical transfer is not switchable in a case where the input system is broadcasting.

* * * * *